United States Patent
Pasquarette et al.

(10) Patent No.: US 9,823,824 B2
(45) Date of Patent: Nov. 21, 2017

(54) CONTEXT SENSITIVE ADAPTABLE USER INTERFACE

(71) Applicant: Kodak Alaris Inc., Rochester, NY (US)

(72) Inventors: Stephen James Pasquarette, Honeoye Falls, NY (US); Joseph Anthony Manico, Rochester, NY (US)

(73) Assignee: KODAK ALARIS INC., Rochester, NY (US)

( * ) Notice: Subject to any disclaimer, the term of this patent is extended or adjusted under 35 U.S.C. 154(b) by 244 days.

(21) Appl. No.: 14/458,953

(22) Filed: Aug. 13, 2014

(65) Prior Publication Data

US 2015/0052439 A1 Feb. 19, 2015

Related U.S. Application Data

(60) Provisional application No. 61/867,325, filed on Aug. 19, 2013.

(51) Int. Cl.
*G06F 3/0486* (2013.01)
*G06F 3/0484* (2013.01)
(Continued)

(52) U.S. Cl.
CPC ........ *G06F 3/04845* (2013.01); *G06F 3/0486* (2013.01); *G06F 3/0488* (2013.01); *G06T 11/60* (2013.01)

(58) Field of Classification Search
CPC .................................................... G06F 3/0486
(Continued)

(56) References Cited

U.S. PATENT DOCUMENTS 6,711,291 B1 * 3/2004 Stubler ............... G06K 9/3233
345/632
7,010,751 B2 * 3/2006 Shneiderman ....... G06F 17/241
707/999.004
(Continued)

FOREIGN PATENT DOCUMENTS

JP 2001255455 A * 9/2001

OTHER PUBLICATIONS

Google.com, "define: icon", retrieved on Jun. 5, 2016, available at <https://www.google.com/search?q=define%3A+icon&oq=define%3A+icon&aqs=chrome..69i57j69i58.6319j0j7&sourceid=chrome&es_sm=0&ie=UTF-8>, 1 page.*
(Continued)

*Primary Examiner* — Reza Nabi
*Assistant Examiner* — Daniel Rodriguez
(74) *Attorney, Agent, or Firm* — Hogan Lovells US LLP

(57) ABSTRACT

A user interface control for an image product creation application is used for adding user supplied text or graphic elements to an image product, wherein the user interface control is responsive to the position relative to a user supplied image, a recognized object within the user supplied image, or an image product related feature, wherein the user interface control provides an indication when the text or graphic elements are positioned proximal to the user supplied image, the recognized object, or the image product related feature, and wherein the user interface control modifies an attribute of the text or graphic elements when placed proximal to the user supplied image, the recognized object, or the image product related feature.

20 Claims, 7 Drawing Sheets

(51) Int. Cl.
*G06F 3/0488* (2013.01)
*G06T 11/60* (2006.01)

(58) Field of Classification Search
USPC .......................................................... 715/731
See application file for complete search history.

(56) References Cited

U.S. PATENT DOCUMENTS

| | | | | |
|---|---|---|---|---|
| 7,596,598 B2* | 9/2009 | Birch | ................... | G06Q 10/10 |
| | | | | 709/204 |
| 8,046,713 B2* | 10/2011 | Yamashita | ............... | G09G 3/20 |
| | | | | 345/658 |
| 8,411,113 B1* | 4/2013 | Cornell | ................. | G06T 15/405 |
| | | | | 345/421 |
| 8,806,332 B2* | 8/2014 | Cok | ........................ | G06T 11/60 |
| | | | | 715/243 |
| 9,275,016 B1* | 3/2016 | Freund | .................. | G06F 17/211 |
| 9,330,437 B2* | 5/2016 | Berglund | .................. | G06T 3/40 |
| 2003/0179244 A1* | 9/2003 | Erlingsson | ............ | G06F 9/4443 |
| | | | | 715/788 |
| 2004/0153971 A1* | 8/2004 | Taniwaki | ............... | G06F 17/212 |
| | | | | 715/255 |
| 2006/0109510 A1* | 5/2006 | Widdowson | .......... | G06F 17/211 |
| | | | | 358/1.18 |
| 2006/0165291 A1* | 7/2006 | Atsumi | ................ | H04N 1/3871 |
| | | | | 382/190 |
| 2007/0019943 A1* | 1/2007 | Sueyoshi | ............... | G03B 15/00 |
| | | | | 396/287 |
| 2008/0026800 A1* | 1/2008 | Lee | ..................... | G06F 3/04817 |
| | | | | 455/566 |
| 2009/0100374 A1* | 4/2009 | Sheasby | ................ | G06F 3/0481 |
| | | | | 715/788 |
| 2009/0253517 A1* | 10/2009 | Bererton | ................. | A63F 13/12 |
| | | | | 463/42 |
| 2009/0276701 A1* | 11/2009 | Nurmi | ................... | G06F 3/0238 |
| | | | | 715/702 |
| 2009/0278806 A1* | 11/2009 | Duarte | .................. | G06F 3/0416 |
| | | | | 345/173 |
| 2011/0035661 A1* | 2/2011 | Balinsky | ............... | G06F 17/218 |
| | | | | 715/243 |
| 2011/0221918 A1* | 9/2011 | Kasahara | ............... | G03B 17/20 |
| | | | | 348/222.1 |
| 2011/0239115 A1* | 9/2011 | Williams | ............ | G06F 3/04815 |
| | | | | 715/702 |
| 2011/0283211 A1* | 11/2011 | Butler | ................... | G06F 3/0481 |
| | | | | 715/769 |
| 2012/0032979 A1* | 2/2012 | Blow | .................... | G06F 1/1626 |
| | | | | 345/647 |
| 2012/0038626 A1* | 2/2012 | Kim | ...................... | H04N 13/007 |
| | | | | 345/419 |
| 2012/0236178 A1* | 9/2012 | Nusbaum | ............... | H04N 5/772 |
| | | | | 348/231.4 |
| 2013/0100161 A1* | 4/2013 | Nonaka | ................. | G06F 17/243 |
| | | | | 345/629 |
| 2013/0125069 A1* | 5/2013 | Bourdev | ............. | G06F 3/04845 |
| | | | | 715/863 |
| 2013/0182946 A1* | 7/2013 | Bala | ........................ | G06K 9/3258 |
| | | | | 382/159 |
| 2013/0222394 A1* | 8/2013 | Fyke | ....................... | G06T 11/60 |
| | | | | 345/467 |
| 2013/0293572 A1* | 11/2013 | Kodimer | ............. | G06F 3/04883 |
| | | | | 345/629 |
| 2013/0339907 A1* | 12/2013 | Matas | ..................... | G06T 11/60 |
| | | | | 715/853 |
| 2013/0342676 A1* | 12/2013 | Amano | .................... | H04N 7/18 |
| | | | | 348/86 |
| 2014/0026038 A1* | 1/2014 | Lee | ........................ | G11B 27/34 |
| | | | | 715/244 |
| 2014/0033124 A1* | 1/2014 | Sorrick | ................... | G06F 3/048 |
| | | | | 715/810 |
| 2014/0109046 A1* | 4/2014 | Hirsch | ...................... | G06F 9/44 |
| | | | | 717/120 |
| 2014/0118551 A1* | 5/2014 | Ikeda | ........................ | B60R 1/00 |
| | | | | 348/148 |
| 2014/0321736 A1* | 10/2014 | Onai | ........................ | G06T 13/80 |
| | | | | 382/154 |
| 2014/0324943 A1* | 10/2014 | Antipa | .................... | H04L 67/42 |
| | | | | 709/203 |
| 2015/0154676 A1* | 6/2015 | Matousek | .......... | G06Q 30/0621 |
| | | | | 705/26.5 |
| 2015/0373174 A1* | 12/2015 | Lee | .................... | G06K 9/00288 |
| | | | | 455/563 |
| 2017/0139877 A1* | 5/2017 | Lee | ....................... | G06F 17/212 |

OTHER PUBLICATIONS

English Translation of Abstract for JP 2001255455 A, published on Sep. 21, 2001, 2 pages.*

* cited by examiner

Configuration Options

CONTEXT SENSITIVE ADAPTABLE USER INTERFACE

CROSS-REFERENCE TO RELATED APPLICATION

This application claims the benefit of U.S. Provisional Application No. 61/867,325, filed Aug. 19, 2013, entitled "Context Sensitive Adaptable User Interface," which is hereby incorporated in its entirety.

FIELD OF THE INVENTION

The present invention relates to a user interface for creating digital image products, and more particularly to a context and content sensitive adaptable user interface for text and/or graphic element placement in the digital image product.

BACKGROUND OF THE INVENTION

Current and prior art photo product creation applications for user created photo products such as photo books, greeting cards, collages, and the like do not handle text well. The addition and positioning of text within image based products is cumbersome and these procedures are focused on technology or product elements, not on the user experience. Many applications treat text as a layer that exists on a picture layer or on the background layer of a digital image product. Users typically are provided with different applications that treat some layer implementations in a unique manner such as a linked annotation where text is placed adjacent to an image, where users can add text to a picture, and add text to a page such as with caption. Other applications simply provide templates that illustrate where text can be placed, either on an image or adjacent to it. More sophisticated applications will adapt the text font size if the number of text characters exceeds the allocated space for text.

With imaging products, if the page is a collage background, one of the four surfaces of a folded card, or a photo book page, whereby the text creation method defines the link and associated behavior of the text. Each different condition including a consumer provided image, a graphic element such as a border or overlay, or a finished product feature such as a fold, seam, or cut line would provide a different real time user interface process, feedback indication, and text placement feature, and text style/color/configuration feature. Additionally, the actual content of the image such as faces, objects, pets, animals, vehicles, and the like are automatically identified via image analysis or provided metadata and also are used to modify the text placement user interface and text placement option relative to the proximity of the identified image content. This technique can also be applied to graphic elements (such as clip art) and extracted photographic objects.

SUMMARY OF THE INVENTION

According to the present invention, a context and content sensitive adaptable user interface for text and/or graphic element placement in digital image products is provided. The text placement and configuration application according to the present invention indicates to the user via visual, haptic, and optionally audio feedback the text placement options that are available on any given area of the image product. Image product areas includes recognized objects and open spaces such as sky, sand, or water in a scene, template surround areas for composite images, collages, and album pages, and folds, gutters, and borders for post printing converting, folding, trimming, and binding operations. As the user drags the text around the layout a plurality of methods are used to convey text and image product associations that are provided, including text conforms, and adapts to the spaces and colors of objects recognized in the image and formatting surrounding the image in real time allowing the user to make visual choices instead of selecting tools and initiating text formatting modifications.

According to the present invention, a user interface system for a computer device, comprises a user interface control for an image product creation application for adding user selected or supplied text or graphic elements to at least one image product, wherein the user interface control is responsive to the position relative to at least one user supplied image, a recognized object within the user supplied image, or the at least one image product related feature, wherein the user interface control provides an indication when the text or graphic elements are positioned proximal to at least one user supplied image, a recognized object within the user supplied image, or the at least one image product related feature, and wherein the user interface control modifies at least one attribute of the color, font, size, shape, surround, or background of the text or graphic elements when placed proximal to at least one user supplied image, recognized object within the user supplied image, or the at least one image product related feature.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Figure 1:
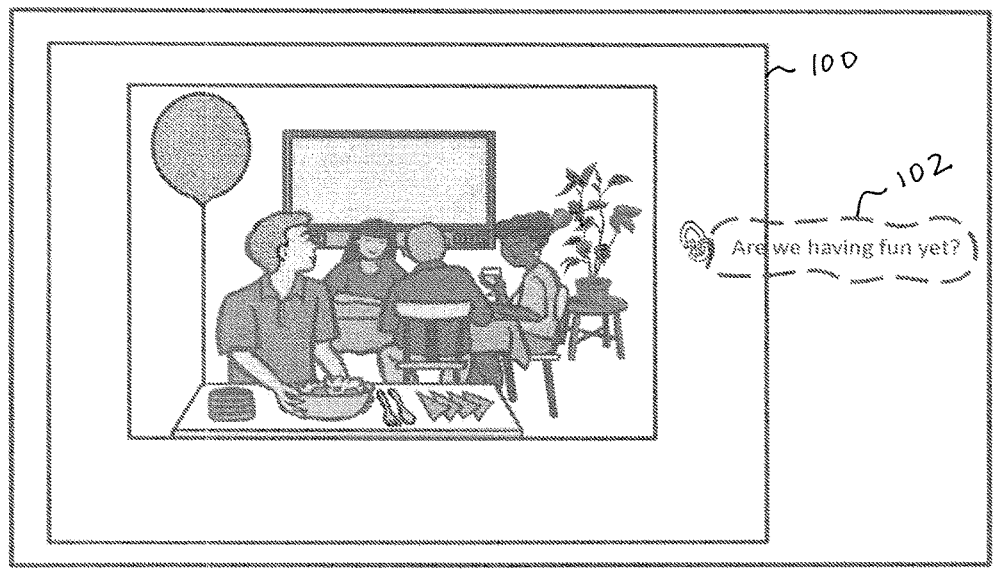
FIGS. 1-8 show a user interface illustrating different text and/or graphic element placements according to the present invention.
Figure 2:
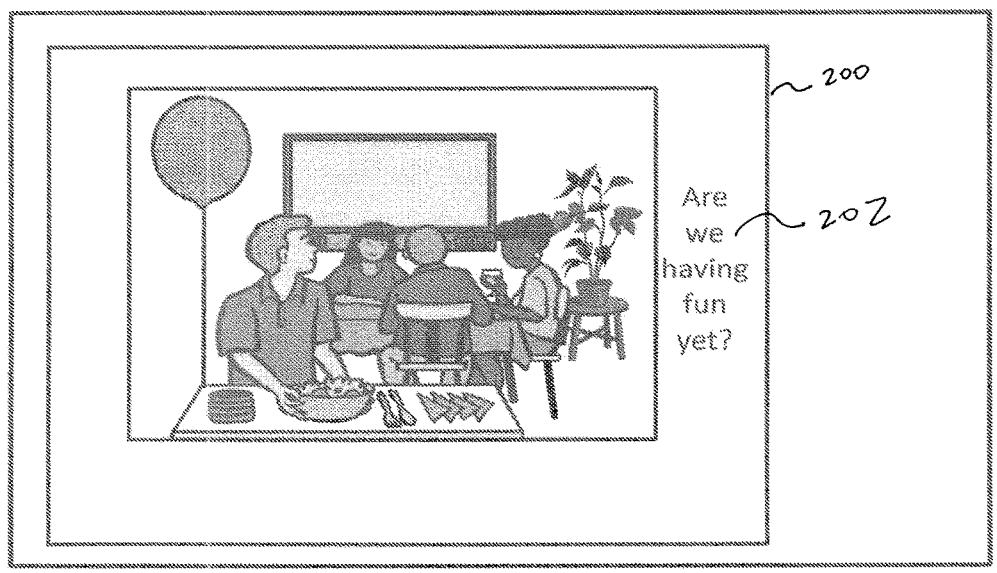

The user interface of the present invention includes many features useful for creating digital image products. For example, text added to a picture cannot be moved to the background. Text added to a page will react either independently to a picture and handled as a separate node on the layout or in relation to the picture (moved during a layout shuffle such that text does not impinge on the image node) but the text is always tied to the background layer of the layout and cannot be tied or linked to the picture (as that requires add text to picture).

Typical image product creation applications do not provide both types of adding text, they provide one and the user must deal with or cope with the system limitations to create the product they want.

The present invention is especially useful on touch enabled tablet style devices or touch screen enabled kiosks since text is added to a layout and allow users to position and link the text as they see fit. The text would be added as the top layer of an imaging product enabling the user to touch the text to drag it to a new location on the layout. Additionally the "text node" could be stretched or shrunk to change the size of the text node, using standard multi-finger gestures or automatically adapt to the content of the image. As the user drags the text around the layout that a plurality of methods are used to convey text plus image associations are provided. The visual and optional audio linking of the text with image content such as detected faces, animals, objects, clipart, or graphic design elements would convey the linkage of the text with that element. Additionally, product design features such as page gutters, crease locations for folded products like greeting cards, When the user drags the text adjacent to a picture a visual method is used to convey the linkage, such as a visual outline around the two elements which would for example "flash" or "alternate colors" to convey that is a linkage indicator rather than a graphic product design element such as a border. Additionally, the text and the image could be linked with a standard technique such as a Graphic User Interface insertion bar or an icon (lock, rope, or carabineer) to indicate that the image and text node "tied" together. This would indicate that the two elements are linked and subsequent actions relating to layout changes such as moving a picture, shuffling elements within a layout, etc. would treat the text and element as a common unit. This relationship would be maintained unless the user chose to separate the elements. Dragging the text links the element as a caption that exists linked outside an image, as text that overlays and image or as freeform text not linked to an image/element. Likewise, touching a linked text node in a defined manner (e.g., after a dwell period) would allow the user to modify the text+element linkage (e.g., a caption could be moved to be linked within the picture or as freeform/unlinked text).

In addition this arrangement facilitates the addition of new imaging products in that the same adaptable text positioning rules will automatically adapt to the new imaging product. The user interface can be adapted to run on a processor equipped device with a display, including a personal computer, a kiosk, a personal mobile device such as a smartphone or a tablet, or a remote display connected to a server computer on the network or the cloud.

One example according to the present invention of image content and product element context sensitive text modification and placement is described below. A face is detected in the digital image. As the user drags text in quotes or quotes added to the text automatically when the text is in a predetermined proximity to the detected face and a "speech or thought bubble" forms around the text with the "point" of the bubble pointed at the mouth of the detected face. Adjusting the position of the text away from mouth of the detected face to the head of the detected face turns the "speech bubble" to a "thought bubble".

Figure 3:
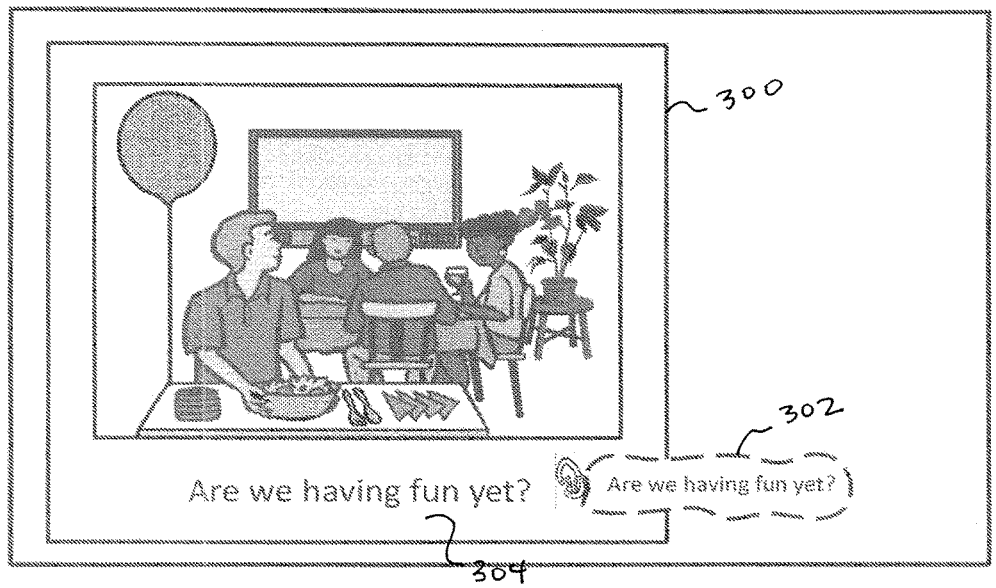
Figure 4:
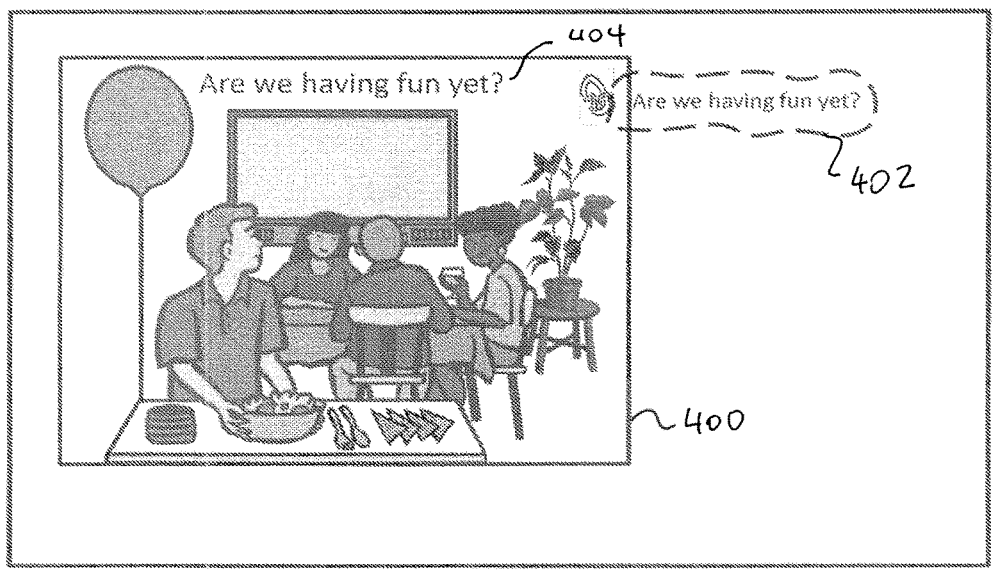
Figure 5:
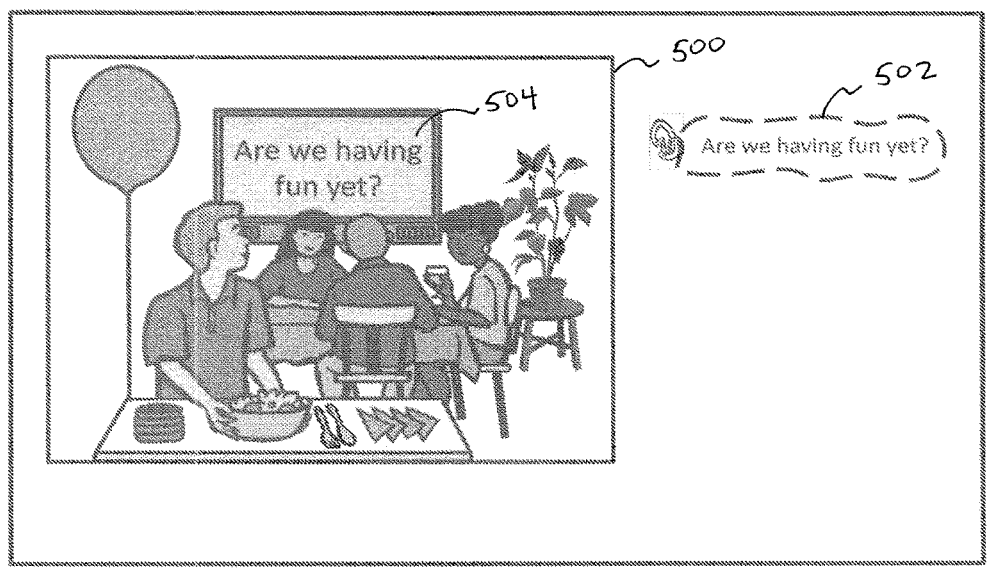
Figure 6:
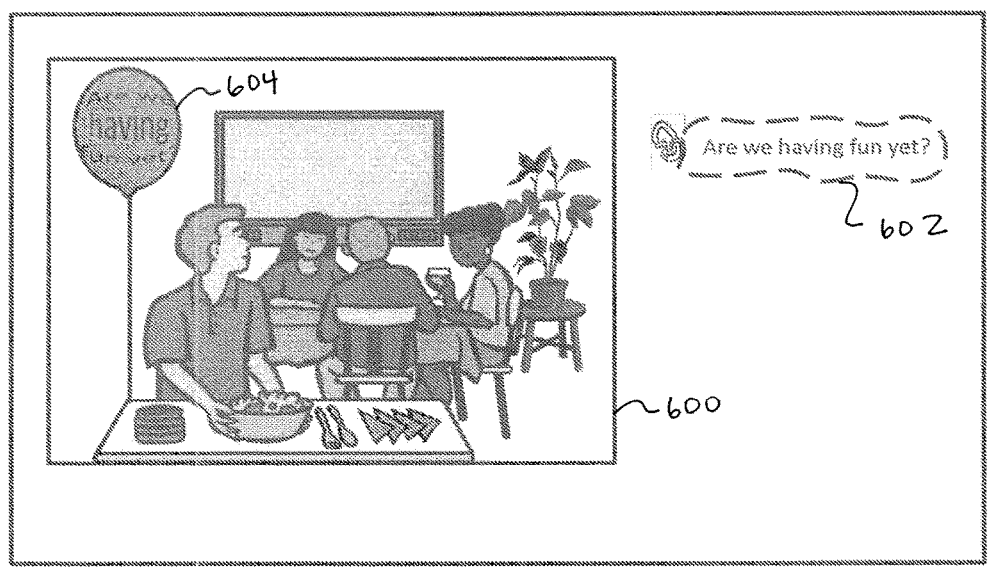
Figure 7:
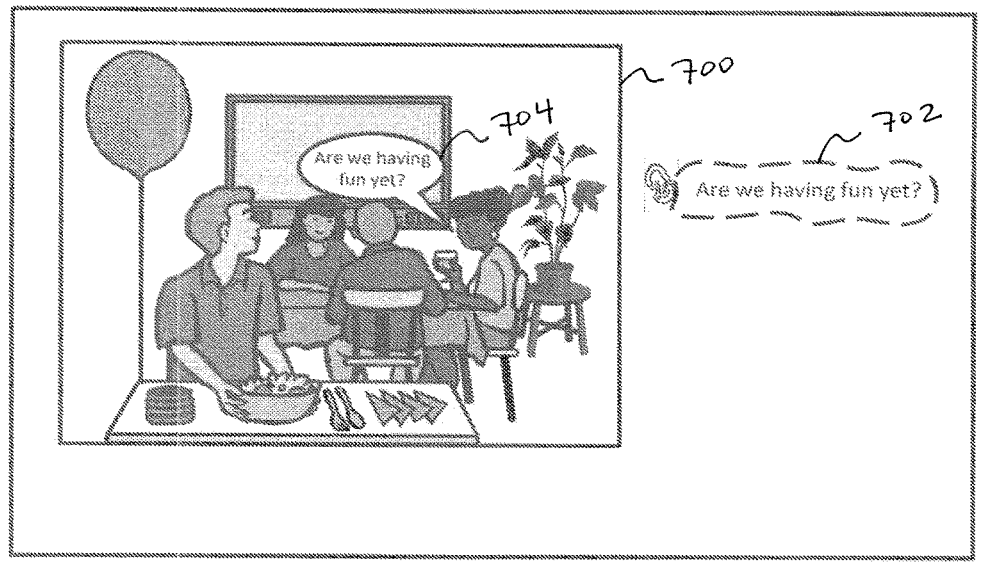
Figure 8:
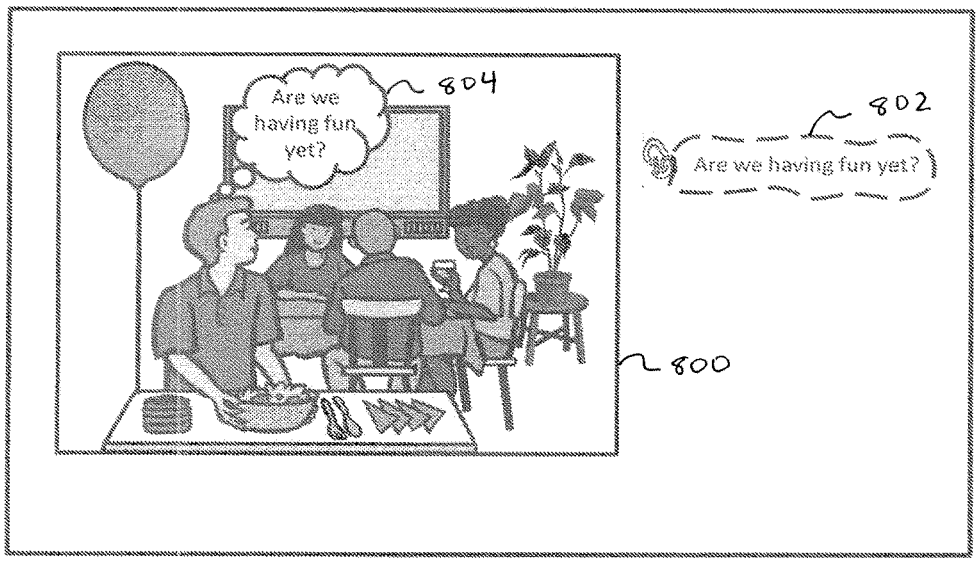

Additional examples are shown below with respect to FIGS. 1-8. Referring now to FIG. 1, an image 100 is shown with a corresponding floating flashing or scrolling text surround 102 including the text "Are we having fun yet?" In the corresponding image 200 of FIG. 2, the text 202 has been placed over a border area of the image 200 and the text has been placed into a side border of the image. In FIG. 3, an image 300 is shown with a floating text surround 302, and text 304 placed at a bottom border of image 300. In FIG. 4, an image 400 is shown with a floating text surround 402, and text 404 placed into a blank upper portion of image 400. In FIG. 5, an image 500 is shown with a floating text surround 502, and text 504 placed into the blank TV screen within the image 500. In FIG. 6, an image 600 is shown with a floating text surround 602, and text 604 conformally placed into a balloon within the image 600. In FIG. 7, an image 700 is shown with a floating text surround 702, and text 704 placed as a speech bubble associated with one of the persons in the image 700. In FIG. 8, an image 800 is shown with a floating text surround 802, and text 804 placed as a thought bubble associated with another of the persons in the image 800.

Figure 9:
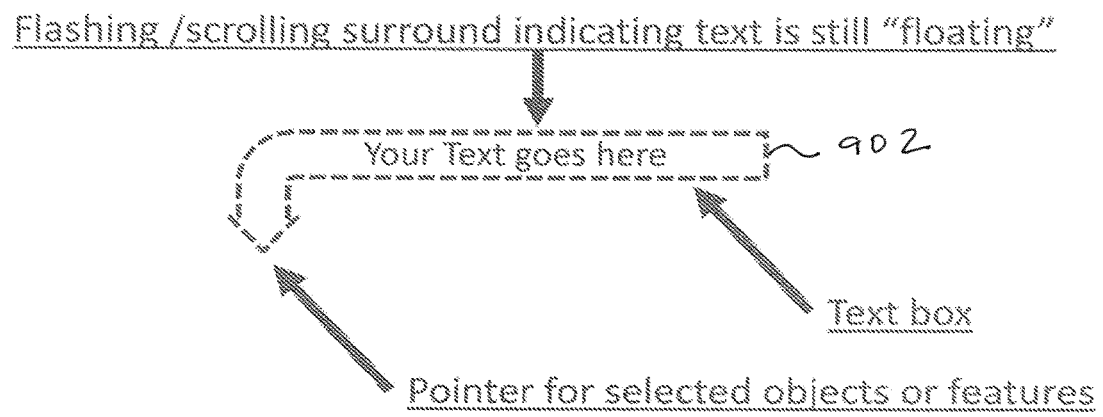
FIG. 9 shows configuration options for placing text in the user interface according to the present invention.
Figure 9:
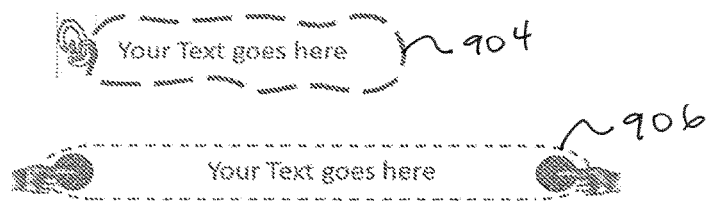
Figure 9:
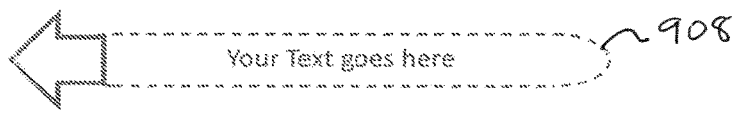
Figure 9:
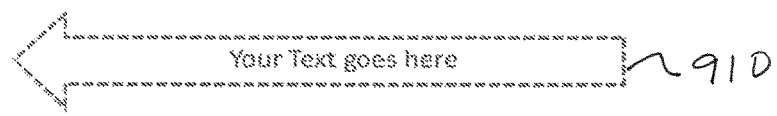
Figure 9:
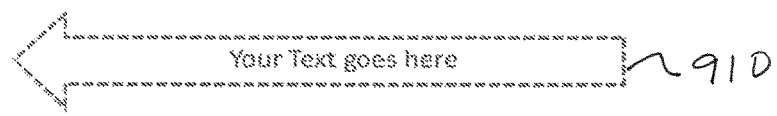

In FIG. 9, a text surround 902 is shown including a flashing or scrolling feature indicating that the text is still floating and be moved around in the user interface as desired. The text surround 902 includes a pointer for selected objects or features, and a text box for displaying the text that is to be placed in an image or somewhere within the digital image product shown in the user interface. Different configuration options for the text surround are shown as the lasso configuration 904, the pointing hands configuration 906, a first pointer configuration 908, and a second pointer configuration 910. Other configurations of the text surround can also be used as desired.

Figure 10:
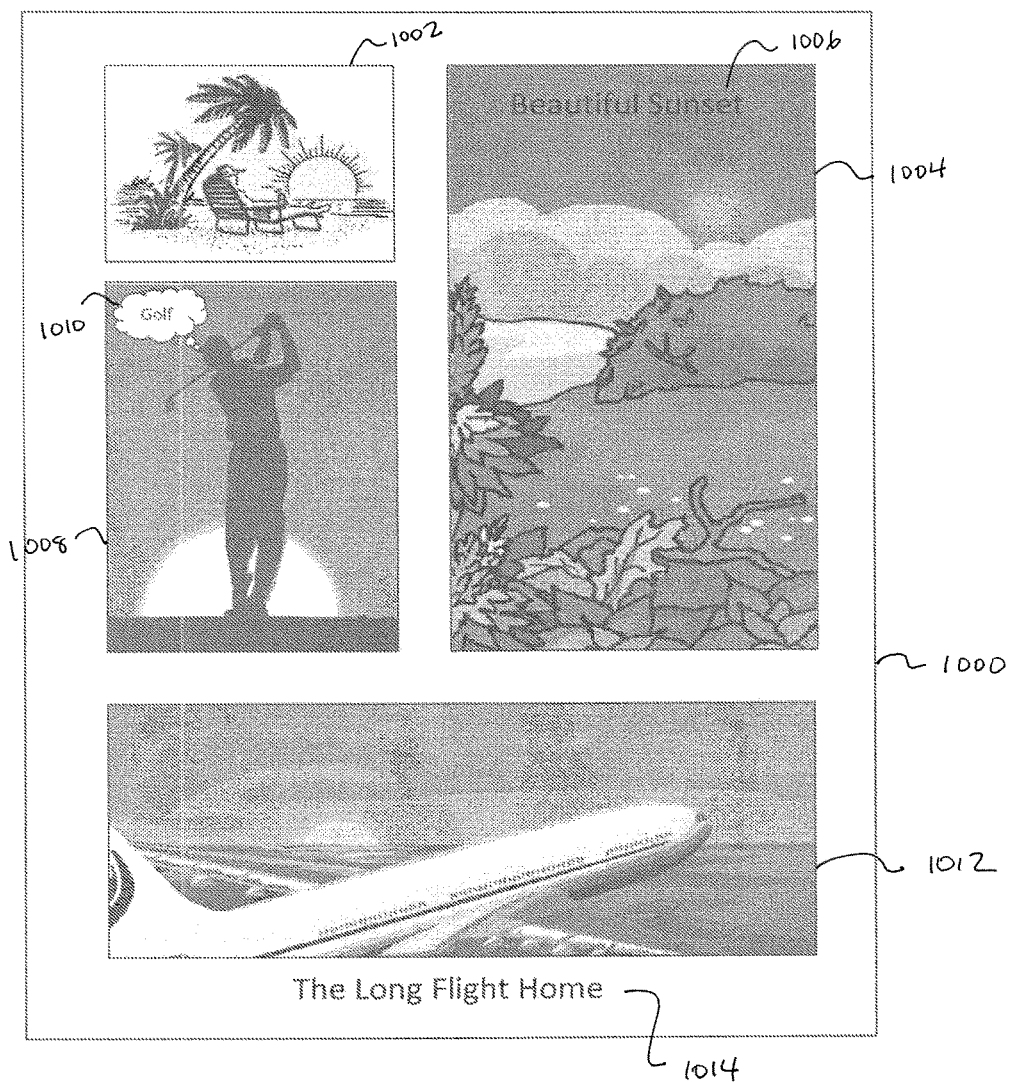
FIG. 10 shows a completed digital image product created using the user interface of the present invention.

Referring now to FIG. 10 a complete digital image product is shown. A first sunset image 1002 is shown without any text. A second sunset image 1004 is shown including "Beautiful Sunset" text 1006 placed in an upper sky portion of image 1004 in a complimentary color, such as yellow. A golf image 1008 includes a "Golf" thought bubble 1010 associated with the golfer in the image 1008. An aircraft image 1012 does not include text but "The Long Flight Home" text 1014 is placed in a border area below image 1012.

Additional features of the user interface of the present invention are described below. For example, text color turns complementary or contrasting to an image background automatically. Placed text pseudo-conforms to the shape and size of an object in an image. When the user hovers text over a simple object, of a more or less uniform color, in the scene, such as a balloon, in the text is center of text expanded and distorted to conform and fill the assumed "3D shape" of the balloon. Using the "balloon example", common identifiable simply shaped objects, such as balloons, balls, TV screens, mirrors, the sides of vehicles, faces, etc. would be assigned a compatible simple wireframe, not visible to the user. When text is "hovered" over the object, the text would re-scale and layout according to the available area of the object and conform the wireframe shape. The user interface of the present invention includes touch screen special features such as multi-finger stretch, gesture, audio commands, and pointing devices. Font style also adjusts text content such as "Are we having fun yet?" would be presented with a fun, casual, humorous font. Text font adjusts to content such as an image of "Big Ben" would be in an "Old English" font. A rodeo would provide a rope-like font (the existence of a rodeo, for example, could be semantically identified, identified by even time/location metadata, social network tagging/captions, or analysis of user supplied text, such as "we are at the rodeo").

A simple Graphical User Interface ("GUI") according to the present invention would include a designated text input area (e.g. graphical lasso to contain the user's text with carabineer to "lock" the text to an object, to a template frame, to an "open" area (sky, sand, flat surface, etc.) of an image. The GUI of the present invention could use a drop shadow like technique to "write in" sand, snow, foam, bubbles, and foliage, and the like. The GUI according to the present invention would include an option for providing user editing of text or graphic after placement (e.g. paint brush stroke instead of crayon). The GUI of the present invention could also suggest text based on content analysis.

Object and face recognition, tags provided from social network comments, and camera generated time and location metadata can be used to provide captions or suitable words for a caption or to suggest a caption. An example of this technique would involve using the camera location metadata and a map application to identify a location as a golf course and a standing individual recognized as the user's father. The system could recommend the caption "Dad loves to golf" or "My Dad is quite the golfer". In addition, potential captions can be suggested as a random or prioritized list, a "word cloud" of suggested terms, and/or as audio phrases that the user can select via verbal commands such as "yes" or "no".

The GUI of the present invention would assign a cascading level of importance of the content in a scene so as not to obscure important content with text or speech or thought bubbles. For example, in a group shot positioning the thought or speech bubble "speaker/thinker" indicator appropriately at the head or mouth of the individual but extending the text area so as not to obscure other faces. Foreground faces facing forward would be assigned a first priority, foreground faces facing sideways would be assigned a second priority, foreground objects would be assigned a third priority, and open/uncluttered spaces would not be assigned a priority and would accept text whenever hovered over.

Figure 11:
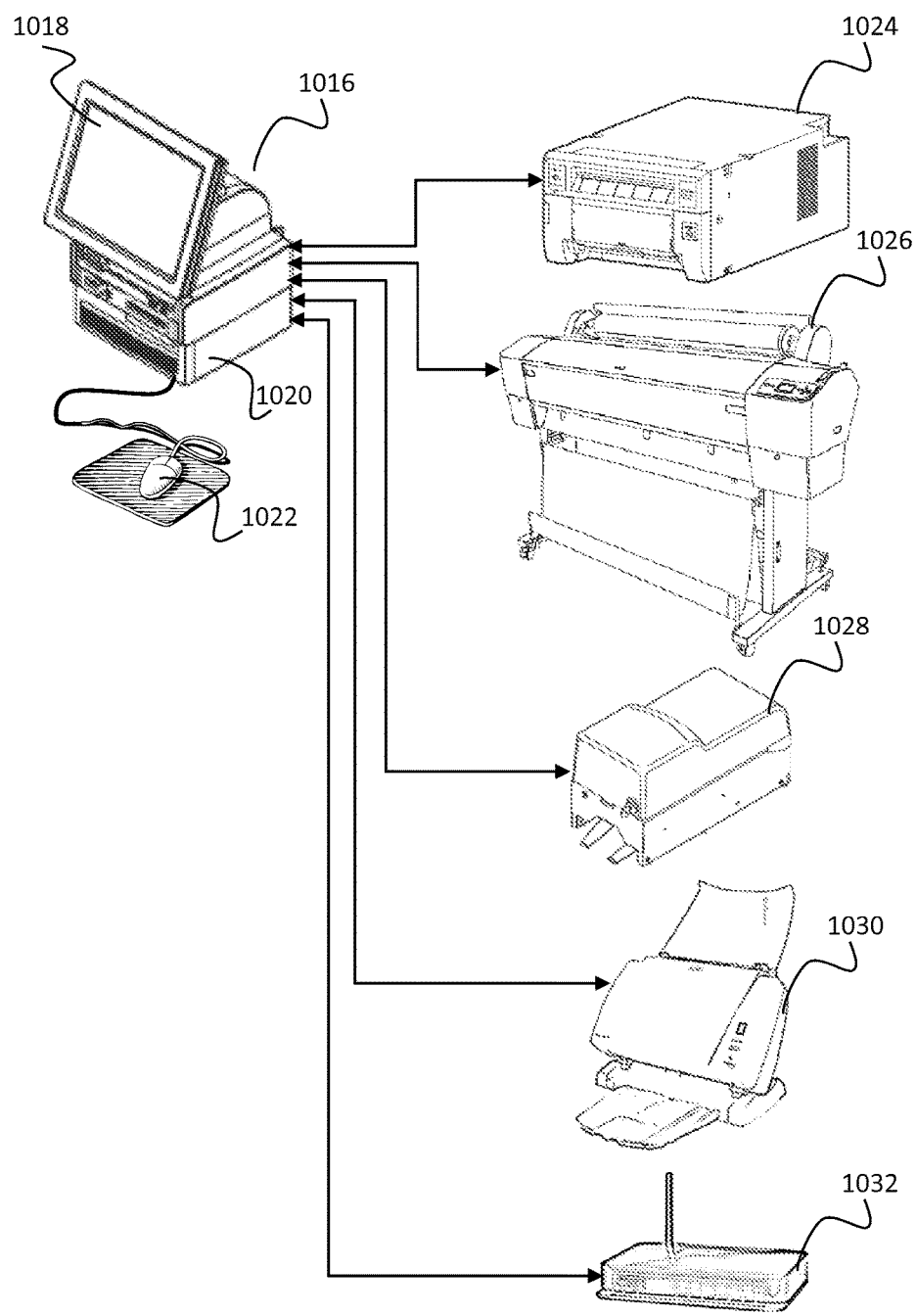
FIG. 11 shows a kiosk system for the application of the present invention where users create custom photo products in a retail environment.

Referring now to FIG. 11 a depiction of a conventional retail photo product kiosk system 1016, with touch screen 1018, computer processor 1020, and UI device 1022 is shown. Kiosk system 1016 represents a typical platform for the application of the present invention where users create custom photo products in a retail environment. The retail environment can include potential distractions presented by other users that queue up to use the system, background noise, and a limitation in available time, potentially limiting the user's ability to focus on menus and software tools making the present invention ideal for this situation. Kiosk system 1016 includes various peripheral device for creating and distributing soft and hard copy photo products including: dye sublimation printer 1024, large format ink jet printer 1026, CD/DVD reader/writer 1028, hard copy scanner 1030, and wireless router 1032 for transmitting soft copy photo products, over the internet, to user designated recipients or to central production facilities for remote photo product fulfillment. As previously described, the present invention can also be practiced on a personal mobile device such as a smartphone or a tablet, or a remote display connected to a server computer on the network or the cloud.

It will be understood that, although specific embodiments of the invention have been described herein for purposes of illustration and explained in detail with particular reference to certain preferred embodiments thereof, numerous modifications and all sorts of variations may be made and can be effected within the spirit of the invention and without departing from the scope of the invention.

The invention claimed is:

1. A context and content sensitive user interface system for a computer device, comprising:
   a processor equipped device having a display; and
   a user interface control for an image product creation application under the control of the processor for adding user selected or supplied text or graphic elements to at least one digital image product;
   wherein the user interface control is configured to:
   analyze the context and content of the digital image product and recognize a plurality of objects within the digital image product;
   allow a user to link the text and/or graphic elements with at least one of the recognized objects within the digital image product;
   in response to dragging the text and/or graphic elements within a predetermined distance to any of the plurality of recognized objects, dynamically suggest to the user modifications to at least one attribute of a color, font, size, shape, surround, or background of the text and/or graphic elements in the digital image product based on the analysis of the context and content of the digital image product by the user interface; and
   as the user drags the text and/or graphic elements, dynamically indicate by the user interface to the user via visual, haptic, or audio feedback text placement options that are available on any given area of the digital image product, wherein the image product areas includes recognized objects and open spaces including template surround areas for composite images, collages, or album pages, or folds, gutters, or borders for post printing converting, folding, trimming, and binding operations.

2. A method of placing text and/or graphic elements in a digital image product comprising:
   providing a context and content sensitive adaptable user interface for the text and/or graphic element placement in a digital image product;
   analyzing the context and content of the digital image product and recognizing a plurality of objects within the digital image product;
   allowing a user to link the text and/or graphic elements with at least one of the recognized objects within the digital image product;
   in response to dragging the text and/or graphic elements within a predetermined distance to any of the plurality of recognized objects, dynamically suggesting to the user modifications to at least one attribute of a color, font, size, shape, surround, or background of the text and/or graphic elements in the digital image product based on the analysis of the context and content of the digital image product by the user interface; and
   as the user drags the text and/or graphic elements, dynamically indicating by the user interface to the user via visual, haptic, or audio feedback text placement options that are available on any given area of the digital image product, wherein the image product areas includes recognized objects and open spaces including template surround areas for composite images, collages, or album pages, or folds, gutters, or borders for post printing converting, folding, trimming, and binding operations.

3. The method of claim 2 wherein, as the user drags the text around the layout a plurality of methods are used to convey text and image product associations.

4. The method of claim 3 wherein text conforms and adapts to the spaces and colors of objects recognized in the image.

5. The method of claim 3 further comprising formatting that can be generated around any part of the image allowing the user to make visual choices instead of selecting tools and initiating text formatting modifications.

6. The method of claim 2 wherein the text is added as a top layer of an imaging product enabling the user to touch the text to drag it to a new location on the layout.

7. The method of claim 6 wherein the text is stretched or shrunk to change the size of the text.

8. The method of claim 7 wherein the text is stretched or shrunk using standard multi-finger gestures.

9. The method of claim 7 wherein the text is stretched or shrunk automatically to adapt to the content of the image.

10. The method of claim 2 wherein a visual or audio linking of the text with image content comprises linking with detected faces, animals, objects, clipart, or graphic design elements.

11. The method of claim 2 wherein the digital image product comprises a greeting card.

12. The method of claim 2 wherein, when the user drags the text adjacent to a picture a visual method is used to convey a linkage, including a visual outline around the two elements which flashes or alternate colors to convey that is a linkage indicator.

13. The method of claim 2 wherein the text and the image are linked with a graphic user interface insertion bar or icon to indicate that the image and text are tied together.

14. The method of claim 2 wherein touching a linked text in a defined manner allows the user to modify the text and element linkage.

15. The method of claim 2 wherein the text font automatically adjusts to the image content.

16. The method of claim 2 further comprising using a designated text input area to lock the text to an object in the image.

17. The method of claim 2 further comprising using a drop shadow technique to write the text into sand, snow, foam, bubbles, or foliage in the image.

18. The method of claim 2 further comprising suggesting text based on content analysis of the image.

19. The method of claim 2 further comprising cascading the level of importance of the content in a scene so as not to obscure important content with text.

20. The method of claim 19 wherein foreground faces facing forward are assigned a first priority, foreground faces facing sideways are assigned a second priority, and foreground objects are assigned a third priority.

* * * * *